United States Patent
Lafage et al.

(10) Patent No.: US 6,667,931 B2
(45) Date of Patent: Dec. 23, 2003

(54) MEMORY CIRCUIT DESIGNED FOR A PARALLEL READING OR WRITING ACCESS TO DATA COMPRISING VARIOUS COMPONENTS

(75) Inventors: Anne Lafage, Aix-en-Provence (FR); Lien Nguyen-Phuc, Paris (FR); Jacky Talayssat, Chateauneuf (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/175,411

(22) Filed: Jun. 19, 2002

(65) Prior Publication Data

US 2003/0016584 A1 Jan. 23, 2003

(30) Foreign Application Priority Data

Jun. 19, 2001 (FR) .............................................. 0108046

(51) Int. Cl.$^7$ ................................................. G11C 8/00
(52) U.S. Cl. .......................... 365/230.03; 365/230.06; 365/230.08; 365/226
(58) Field of Search ....................... 365/230.03, 230.06, 365/230.08, 226

(56) References Cited

U.S. PATENT DOCUMENTS 5,959,929 A * 9/1999 Cowles et al. ......... 365/230.03
5,978,303 A * 11/1999 Takasugi et al. ....... 365/230.03
6,438,063 B1 * 8/2002 Lee ........................ 365/230.03

OTHER PUBLICATIONS

Architecture d'un acceleraterur material pour la composition d'objjets video MPEG–r C. Miro, These de doctorat a l'Ecole Nationale Superieure de Telecommunications, specialite electronique et communications, 18 fevrier 2000.

* cited by examiner

*Primary Examiner*—Michael S. Lebentritt
*Assistant Examiner*—Pho Luu
(74) *Attorney, Agent, or Firm*—Steven R. Biren

(57) ABSTRACT

The present invention relates to a memory circuit (MEM) able to receive a first data block comprising a number of components and coming from an external memory (EXT) for them to be written (W) in an internal memory. The memory circuit is also able to supply (R) to an output device (FIL) a second data block comprising a component of said data. The memory circuit comprises data banks able to receive data words, and address controllers associated to the data banks and able to organize a reading or writing access of the data in the internal memory of the memory circuit, while minimizing the number of data banks used. Thus it is possible to rapidly read or write in the memory circuit at relatively low cost.

3 Claims, 4 Drawing Sheets

MEMORY CIRCUIT DESIGNED FOR A PARALLEL READING OR WRITING ACCESS TO DATA COMPRISING VARIOUS COMPONENTS

FIELD OF THE INVENTION

The present invention relates to a memory circuit able to temporarily store a first block of data comprising no more than N components, and able to produce a second block of N lines of a component of said data, said memory circuit comprising data banks able to receive data words, and address controllers associated to the data banks.

The invention notably finds its application in digital devices intended for rendering video objects such as, for example, MPEG-4 video decoders, 3D graphics accelerators, video games, digital personal assistants or also mobile telephones.

BACKGROUND OF THE INVENTION

Such a memory circuit is known in the field of digital image processing, notably for pixel interpolation operations using bidimensional filters. For example, in the case of bidimensional filters of 4×4 pixels, the memory circuit has an organization that is described in FIG. 1. Said memory circuit comprises data banks numbered 0 to 7 in the example chosen. The database contains at least a word of 32 bits (S) comprising the values of a component (C) of 4 horizontally contiguous pixels (p1–p4). In the case of MPEG-4 digital video data the component is luminance Y, chrominance U or V or transparency A. For permitting parallel access to the component block of 4×4 pixels, it is not necessary to place 4 words of 32 vertically contiguous bits in the same database. In consequence, 2 words of 32 vertically contiguous bits are placed in 2 consecutive data banks numbered n modulo-8 and n+1 modulo-8, where modulo-8 is the operation of which the result is the remainder of division by 8. Moreover, the block of the component of 4×4 pixels one wishes to have reading access to may be spanning 2 words of 32 horizontally contiguous bits. In order to permit parallel access to the block of the component of 4×4 pixels, 2 words of 32 horizontally contiguous bits thus must not be placed in the same database. In consequence, 2 words of 32 horizontally contiguous bits are placed in 2 different data banks numbered n modulo-8 and n+4 modulo-8. Thus, such a memory circuit permits parallel reading access to an arbitrary block of 4×4 pixels of a data component such as, for example, the block represented in gray (BLO), without a conflict between the various data banks.

The principle of such a memory circuit is described in the document entitled "Architecture d'un accélérateur matériel pour la composition d'objets vidéo MPEG-44"C. Miro, Thèse de doctorat à l'Ecole Nationale Supérieure de Télécommunications, spécialité électronique et communications, Feb, 18, 2000.

However, this organization of the internal memory of the memory circuit is devised for a two-dimensional access, that is to say, only for a parallel reading or writing access to one of the components of a pixel block. The organization is optimal when the components which are written in the internal memory come from an external memory where they are stored separately, that is to say, if the words successively written in the internal memory correspond to the same component C of various consecutive pixels p1 to pn (C[p1] –C[pn]). The data supplied by the external memory are often available in coplanar format, that is to say, in the form of a structure successively comprising the various components A, Y, U and V for each pixel pi (A[pi]Y[pi]U[pi]V[pi]). In order to permit three-dimensional access to the data as illustrated in FIG. 2, that is to say, either a parallel reading access (R) through an output circuit (OUT) to a first pixel block of one of the components of said pixels, or a parallel writing access (W) through an external memory (EXT) to a second data block comprising, in succession, the components of each data, these two types of access being independent, a multiplication of the data banks in accordance with the diagram of FIG. 3 is necessary. One thus finds oneself with 32 data banks numbered from 0 to 31 in accordance with the principle explained above. This solution has the disadvantage of being particularly complex to use because it augments the number of data banks and, in consequence, the number of address controllers which make it possible to manage the internal memory.

SUMMARY OF THE INVENTION

It is an object of the present invention to propose a memory circuit able to manage in a more simple and efficient way a three-dimensional access of data comprising various components.

For this purpose, the memory circuit according to the present invention is characterized in that the address controllers associated to the data banks are able to store:

N first words of a first component which are mutually vertically contiguous in N first data banks having N different numbers, N second words of the first component which are mutually vertically contiguous and horizontally contiguous to the N first words, in N second data banks which have N other different numbers, and N words of a second component, which are mutually vertically contiguous and correspond to the same data as N words of the first component, in data banks which have numbers corresponding to a circular permutation of the database numbers associated to the N words of the first component.

The present invention also relates to a video data decoder comprising an external memory able to produce a first block of video data, the memory circuit described above being able to temporarily store the first video data block and able to produce a second block of n lines of a component of said video data, and a processing device able to process the second video data block.

Such a memory circuit utilizes no more than 2N different data banks if the width of the second data block is such that the latter cannot span more than 2 data words, that is 8 data banks instead of 32 data banks of the solution which would become evident to a person of ordinary skill in the art from the prior art. In fact, the same database is used here for storing various different data components which considerably reduces the number of data banks compared to the state of the art. Thus, the organization of the memory circuit which permits the storage of the data is such that the reading of a data block makes it necessary to read only a single memory address per database to obtain the values in said data block for an arbitrary data component.

The implementation of such a circuit will be facilitated as the number of address controllers has been divided by the number of components. The reduction of the number of data banks thus simplifies the decoding of the addresses and thus the overall size of the memory. In consequence, thanks to these instances of parallel access, it is possible to read or write rapidly in the memory circuit at relative low cost.

BRIEF DESCRIPTION OF THE DRAWINGS

These and other aspects of the invention are apparent from and will be elucidated, by way of non-limitative example, with reference to the embodiment(s) described hereinafter.

In the drawings.

DETAILED DESCRIPTION OF AT LEAST ONE EMBODIMENT OF THE INVENTION

Figures 1, 2:
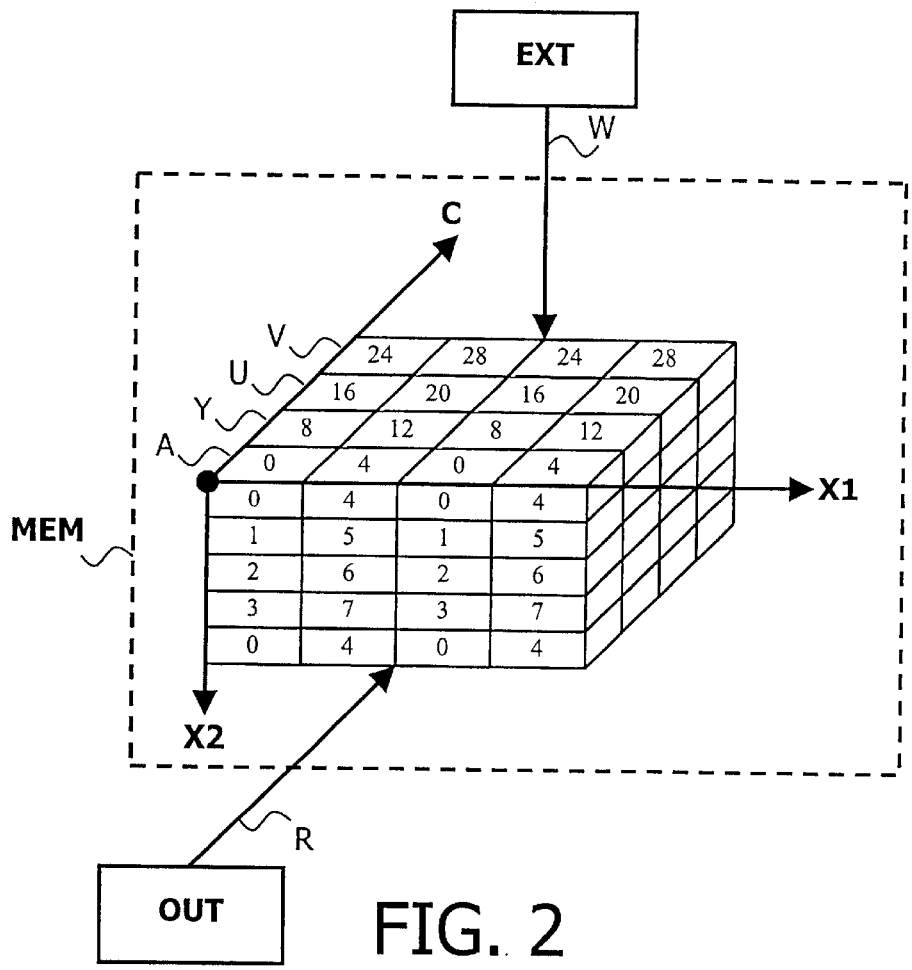
FIG. 1 illustrates the organization of a memory circuit according to the state of the art for a two-dimensional access to a data component.
FIG. 2 illustrates what would be the organization of a memory circuit for a three-dimensional access to data comprising various components, based on the teaching of the state of the art.
Figure 3:
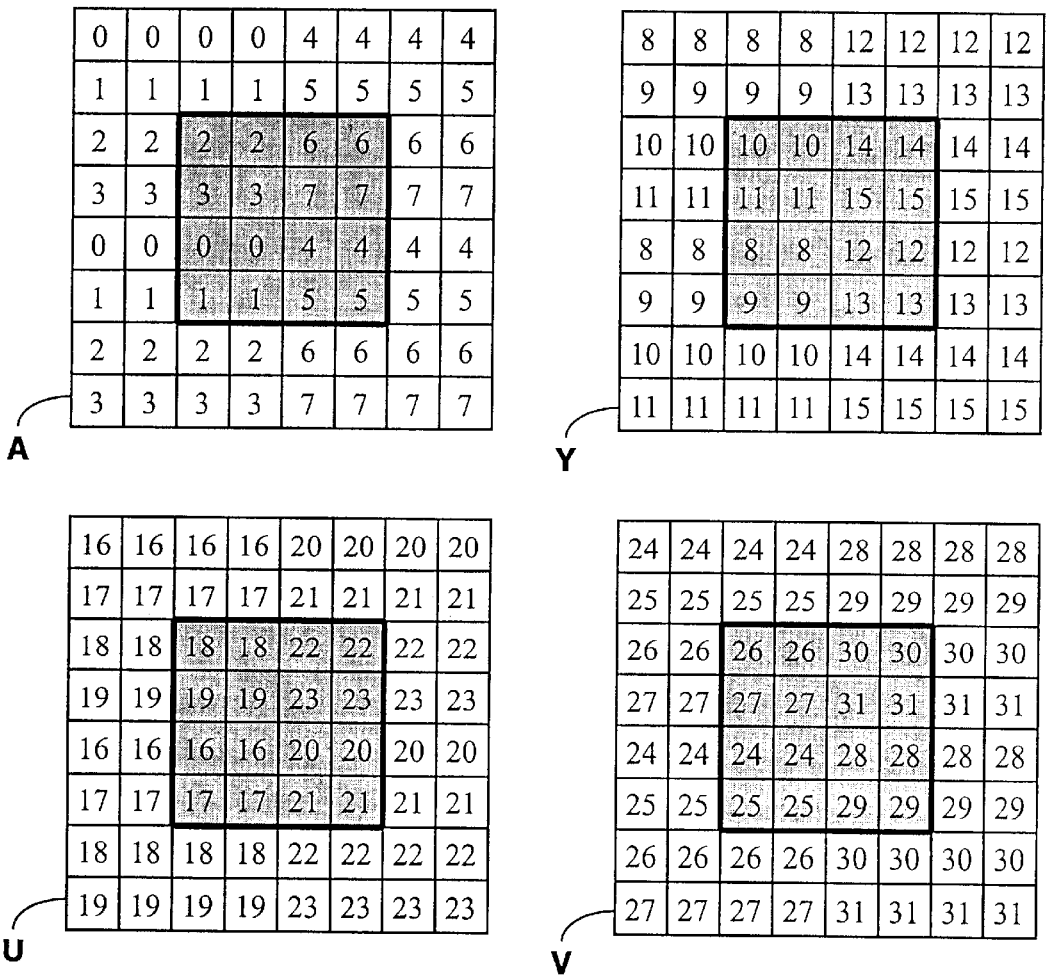
FIG. 3 is a diagrammatic representation of the organization of the memory circuit of FIG. 2 for each of said components.
Figure 4:
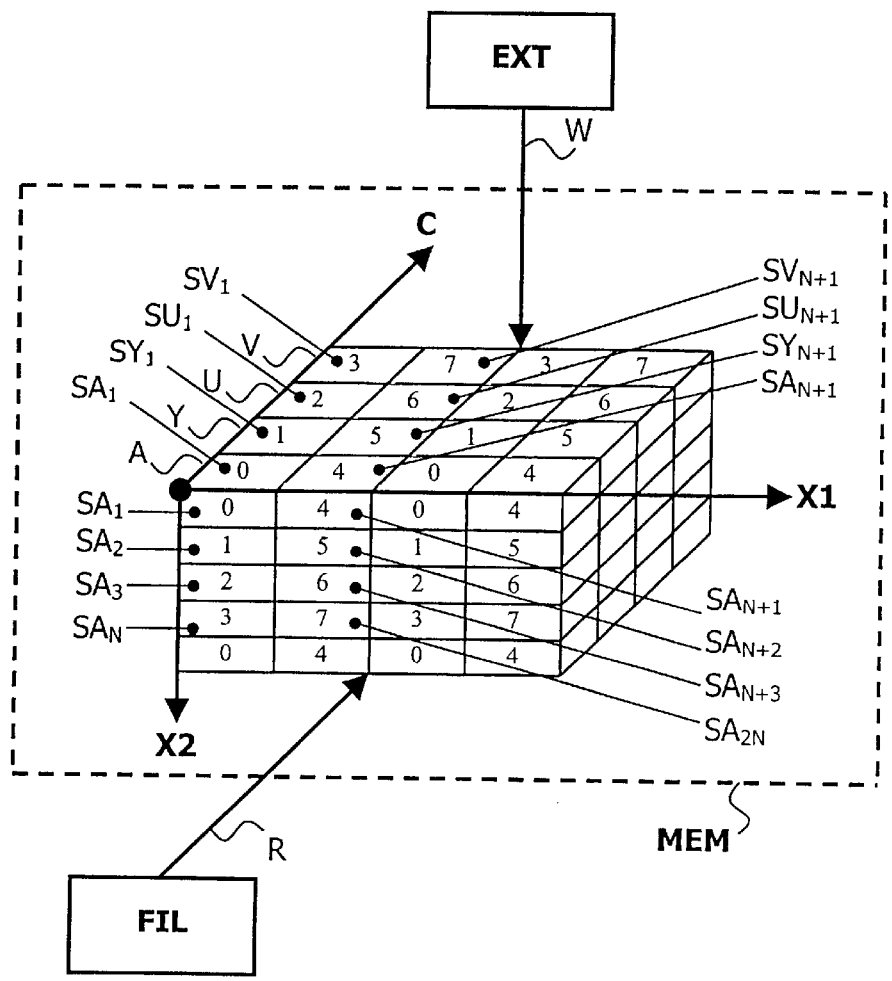
FIG. 4 illustrates the organization of the memory circuit in accordance with the invention for a three-dimensional access to data comprising various components.

The present invention relates to a memory circuit organized for being able to write or read in optimum fashion data comprising various components in an internal memory. Such a memory circuit is represented in FIG. 4. This may be, for example, a random arbitrary-access memory RAM.

Said memory circuit (MEM) is able to receive a first data block coming from an external memory (EXT) so as to write it (W) in its internal memory. Such a memory circuit is particularly adapted to the image processing domain. In this case the data are pixels. Each pixel comprises 4 components in our example, one luminance component Y, two chrominance components U and V and one transparency component A which is characteristic of the MPEG-4 standard. Other components can be envisaged. The transparency components A can be replaced, for example, by a binary shape component. The pixels coming from the external memory may be available in the form of words of the same component of various consecutive pixels, for example, words of 32 bits of the same component for 4 consecutive pixels, each value of a component being coded on 8 bits. The pixels coming from the external memory may also be available in coplanar format, that is to say, in the form of a structure successively comprising the various components A, Y, U and V for each pixel. In our example the memory circuit is to support the coplanar writing mode of 4 pixels of the component A, 4 pixels of the component Y, 4 pixels of the component U and 4 pixels of the component V, that is:

A[p1]Y[p1]U[p1]V[p1]A[p2]Y[p2]U[p2]V[p2]A[p3]Y[p3]U[p3]V[p3]A[p4]Y[p4]U[p4]V[p4].

The memory circuit may also support other coplanar writing modes such as, for example:

A[p1]A[p2]Y[p1]Y[p2]U[p1]U[p2]V[p1]V[p2]A[p3]A[p4]Y[p3]Y[p4]U[p3]U[p4]V[p3]V[p4].

The memory circuit (MEM) is also able to supply (R) to an output device a second data block of N lines by M columns of a data component, where N and M are positive integers. The output device is in our example a two-dimensional N×M and more precisely here 4×4 filter (FIL). Such a filter permits to carry out a pixel interpolation during the calculation of a geometric transformation so as to transform, for example, an MPEG-4 video object in a scene coded according to the MPEG-4 standard.

The internal memory comprises data banks numbered 0 to 7 in FIG. 4, said bases being able to receive data words of 32 bits. With each database is associated an address controller (not shown in FIG. 4), which permits to write or read at a given location of the internal memory of the memory circuit. The address controller permits to calculate a physical address of the internal memory in which one will read or write, from a geometrical position in an image of a pixel pi corresponding to a component C[pi].

The internal memory is organized in 3 dimensions, the plane (X1, X2) corresponding to the read plane, the plane (X1, C) corresponding to the write plane. Thanks to the address controllers the memory circuit writes the 32-bit data words in its internal memory in the following manner.

The N first words ($SA_1$–$SA_N$) of a first component (A), which are mutually vertically contiguous, are stored in N first data banks which have N different numbers. In the preferred embodiment 2 data banks corresponding to vertically contiguous words ($S_n$, $S_{n+1}$) have numbers equal to the remainders of the divisions by 2N of an arbitrary positive integer n and of an integer n+1, respectively, that is n modulo-2N and n+1 modulo-2N. Thus, in the representation of FIG. 4, N is equal to 4 and the N first vertically contiguous data banks are numbered 0 to 3.

The N second words ($SA_{N+1}$–$SA_{2N}$) of the first component, which are mutually vertically contiguous and horizontally contiguous to the N first words, are stored in N second data banks which have N other different numbers. In the preferred embodiment 2 data banks corresponding to horizontally contiguous words ($S_n$, $S_{n+N}$) have numbers equal to the remainders of the divisions by 2N of an arbitrary positive integer n and an integer n+N, respectively, that is, n modulo-2N and n+N modulo-2N. Thus, in the representation of FIG. 4, N is equal to 4 and the N second data banks which are mutually vertically contiguous and horizontally contiguous to the N first data banks are numbered 4 to 7.

Finally, the N first words ($SY_1$–$SY_N$) and second words ($SY_{N+1}$–$SY_{2N}$) of a second component (Y) corresponding to the same pixels as the N first and second words of the first component, are stored in data banks which have numbers corresponding respectively to a circular permutation of the numbers of said first and second data banks. In the preferred embodiment 2 data banks corresponding to 2 words ($SA_n$, $SY_n$) comprising 2 different components (A, Y) of the same pixel have numbers which are equal to the remainders of the divisions by 2N of an arbitrary positive integer n and an integer n+p, respectively, where p is comprised between 1 and a number of components, that is, n modulo-2N and n+p modulo-2N. Thus in the representation of FIG. 4, N is equal to 4 and the N second data banks containing the words of 32 data bits $SA_1$, $SY_1$, $SU_1$ and $SV_1$ of each of the components A, Y, U and V are numbered from 0 to 3, respectively, whereas the data banks $SA_{N+1}$, $SY_{N+1}$, $SU_{N+1}$ and $SV_{N+1}$ are numbered 4 to 7, respectively.

Figure 5:
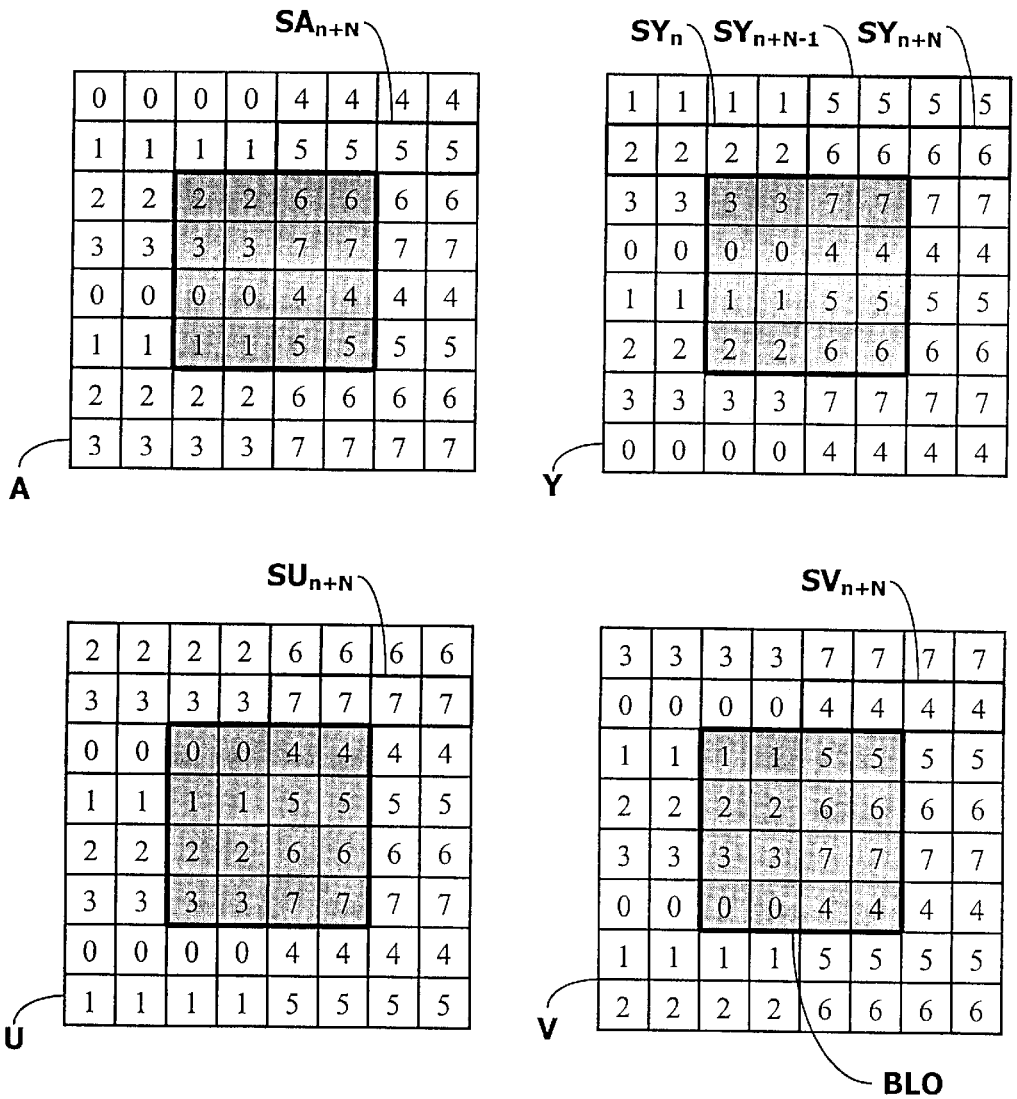

FIG. 5 is a diagrammatic representation of the organization of the memory circuit according to the invention for each of said components. It is again found that data word $SY_{n+N}$ of a component, for example luminance Y, is stored in a database having a different number than a database that contains a word of horizontally ($SY_n$) or vertically ($SY_{n+N-1}$) adjacent data or a database that contains a data word of a different component ($SA_{n+N}$, $SU_{n+N}$, $SV_{n+N}$).

Thus the memory circuit permits, on the one hand, a parallel writing access to a block of 4 pixels of 4 data components, these 4 pixels being produced component by component or in co-planar format. On the other hand, the memory circuit permits parallel writing access, independent of the parallel reading access, to an arbitrary block of 4×4 pixels of a pixel component such as, for example, the block represented in gray (BLO) in FIG. 5, the reading or writing access taking place without a conflict between the various data banks.

The memory circuit according to the present invention has been described in a particular case of implementation. The organization of the internal memory corresponds to the case where words of 32 bits are stored and where the output device is a filter which effects instances of access to blocks of 4×4 data. It will be evident to a man of ordinary skill in the art that the present invention can also be applied to any memory circuit whatever the size of the data blocks to be read, whatever the size of the data words and whatever the type of access. In a general case the number of data banks necessary for the organization of the memory circuit for permitting three-dimensional access to data is equal to the number of data banks which is necessary for the organization of the memory circuit of the state of the art to permit two-dimensional access to the data. Thus if the size of the data blocks to be read is N lines by M columns and if the size of the data words is q multiplied by R bits, by supposing that a value of a component is coded on q bits, the number of data banks necessary for the organization of the memory circuit according to the invention is equal to the product of N by a multiplication factor mc which is a function of M and R. This multiplication factor mc represents the possibility for a data block to be read to be found back spanning mc data banks in the worst case. The multiplication factor mc equals 1 if M=1, 2 if M=2 to R+1, 3 if M=R+2 to 2R+1, and it more generally equals k if M=(k−2).R+2 to (k−1). R+1.

It will be evident, however, to a man of ordinary skill in the art that the present invention is only applied if the instances of access in the plane (X1, X2) are independent of the instances of access in the plane (X1, C). Moreover, the organization of the memory is only applicable to any type of data comprising no more than N components for a memory circuit comprising N multiplied by mc data banks. Worded differently, if the memory circuit is to store N components, it will comprise at least N multiplied by mc data bank.

Figure 6:
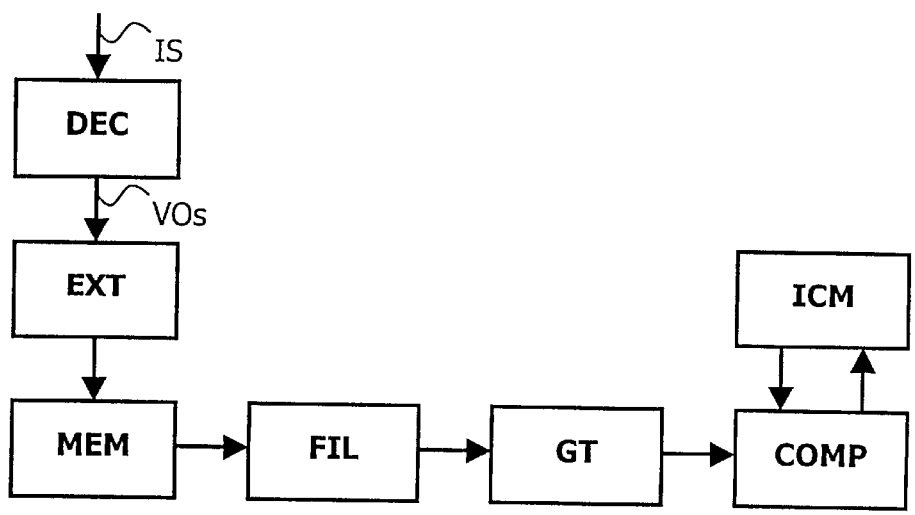
FIG. 5 is a diagrammatic representation of the organization of the memory circuit according to the invention for each of said components and FIG. 6 is a diagrammatic representation of a data decoder in the MPEG-4 format.

FIG. 6 describes a data decoder according to the MPEG-4 standard. A data stream (IS) is first of all decoded by a decoding circuit (DEC) resulting in a set of video objects (VOs). These video objects are stored in an external memory (EXT), for example, in the co-planar format previously described. The composition of the video objects with respect to their being displayed is then effected in two main steps. During a first step a first video object (VO1) is processed. Said first video object is transferred data block by data block in the memory circuit (MEM) according to the invention. A data block which has just been stored in the memory circuit is then processed with the aid of a processing unit (FIL) which is a filter unit in the preferred embodiment, then subjected to a geometrical transformation via a geometrical transformation unit (GT). The first video object then goes through a composition unit (COMP) in order to be stored in an intermediate composition memory (ICM). In a second step a second video object and the first video object are composed in the following manner data block by data block. The second video object (VO2) is first subjected to a processing similar to the first video object, that is to say, a temporary storage in the memory circuit (MEM), a filtering (FIL) and a geometrical transformation (GT). Then the data block of the second video object coming from the geometrical transformation unit is composed with the data block of the first video object coming from the intermediate composition memory (ICM). The intermediate composed video object resulting from this composition is stored in the intermediate composition memory. The second step is repeated as many times as there are video objects to be composed. A new video object is read from the external memory (EXT) data block by data block and then stored in the memory circuit (MEM), filtered, transformed and finally composed with the intermediate composed video object stored in the intermediate composition memory. The result of this composition is again stored in the intermediate composition memory. When the set of video objects is composed, the scene is ready to be displayed on a screen.

No reference sign in parentheses in the present text is to be interpreted as being limitative. The verb "to comprise" and its conjugations is also to be broadly interpreted, that is to say, as not excluding the presence or other elements or steps than those listed after said verb, but also a plurality of elements or steps already mentioned after said verb and preceded by the word "a" or "an".

What is claimed is:

1. A memory circuit (MEM) able to temporarily store a first block of data comprising no more than N components, and able to produce a second block of N lines of a component of said data, said memory circuit comprising data banks able to receive data words, and address controllers associated to the data banks, and able to store:

N first words ($SA_1$–$SA_N$) of a first component (A) which are mutually vertically contiguous in N first data banks having N different numbers, N second words ($SA_{N+1}$–$SA_{2N}$) of the first component which are mutually vertically contiguous and horizontally contiguous to the N first words, in N second data banks which have N other different numbers, and N words ($SY_1$–$SY_N$, $SY_{N+1}$–$SY_{2N}$) of a second component (Y), which are mutually vertically contiguous and correspond to the same data as N words ($SA_1$–$SA_N$, $SA_{N+1}$–$SA_{2N}$) of the first component, in data banks which have numbers corresponding to a circular permutation of the database numbers associated to the N words of the first component.

2. A memory circuit as claimed in claim 1, in which 2 data banks corresponding to vertically contiguous words ($S_n$, $S_{n+1}$) have numbers equal to the remainders of the divisions by 2N of an arbitrary positive integer n and an integer n+1, respectively, 2 data banks corresponding to horizontally contiguous words ($S_n$, $S_{n+N}$) have numbers equal to the remainders of the divisions by 2N of an arbitrary positive integer n and an integer n+N, respectively, and 2 data banks corresponding to 2 words ($SA_n$, $SY_n$) of 2 different components (A, Y) of the same data have numbers equal to the remainders of the divisions by 2N of an arbitrary positive integer n and an integer n+p, respectively, where p is comprised between 1 and a number of components.

3. A video data decoder comprising no more than N components, said decoder comprising an external memory (EXT) able to produce a first block of video data, a memory circuit (MEM) able to temporarily store the first block of video data and able to produce a second block of N lines of a component of said video data and a processing device (FIL) able to process the second video data block, the memory circuit comprising data banks able to receive data words, and address controllers associated to the data banks and able to store:

N first words ($SA_1$–$SA_N$) of a first component (A) which are mutually vertically contiguous in N first data banks having N different numbers, N second words ($SA_{N+1}$–$SA_{2N}$) of the first component which are mutually vertically contiguous and horizontally contiguous to the N first words, in N second data banks which have N other different numbers, and N words ($SY_1$–$SY_N$, $SY_{N+1}$–$SY_{2N}$) of a second component (Y), which are mutually vertically contiguous and correspond to the same data as N words ($SA_1$–$SA_N$, $SA_{N+1}$–$SA_{2N}$) of the first component, in data banks which have numbers corresponding to a circular permutation of the database numbers associated to the N words of the first component.

* * * * *